Patented Mar. 7, 1933

1,900,859

UNITED STATES PATENT OFFICE

GERALD C. CONNOLLY AND ERNEST B. MILLER, OF BALTIMORE, MARYLAND, ASSIGNORS TO THE SILICA GEL CORPORATION, OF BALTIMORE, MARYLAND, A CORPORATION OF MARYLAND

METHOD OF MAKING GELS

No Drawing. Application filed July 25, 1930, Serial No. 470,761, and in Germany April 27, 1928.

The present invention relates to highly adsorbent gels of varying densities, and methods of preparing the same.

Heretofore in the preparation of adsorbent gels, a hydrogel is made which is washed and then dried.

The principal feature of the present invention is the discovery that the temperature of the wash liquid controls the apparent density of the final product, that is, whether it is a wide or narrow pore gel or has pores of an intermediate size.

Usually, the first or second time that a gel is reactivated by heat, its density is increased, the higher the temperature of activation, the greater the increase in density.

Another feature of the present invention is the discovery that the product is more heat stable if washed with hot water, that is, it will withstand activations at high temperatures with less increase in density.

Other features and objects of novelty will be apparent from the following description.

The steps of the complete process are as follows:

Step 1.—A hydrogel that can be converted into a highly adsorbent gel is prepared in any suitable manner. According to one well-known method, in order to secure a silica hydrogel, silicate and acid solutions are mixed with violent agitation in such proportions and concentrations as to give a solution termed "sol", having an acidity of 0.1 N. to 0.9 N., preferably 0.5 N. Thus, if silicate and acid solutions of equal volumes are employed, a 25° Bé. solution of sodium silicate may be taken and a 21.5° Bé. sulphuric acid solution. The sodium silicate employed contains about 4.6% available $Na_2O$ and 16.35% available $SiO_2$. The sulphuric acid solution employed contains about 23.25% available $H_2SO_4$. The vigorous agitation is required in order to maintain all parts of the solution acid. If the ingredients are taken in concentrations and proportions such that the excess of the acid in the solution is very small, say less than 0.1 N., the tendency of the ingredients to react and form a precipitate can be retarded by cooling the ingredients either before or at the time of mixing.

Step 2.—The solution, or "sol", is allowed to stand, and its viscosity gradually increases until after a few hours the whole body of the sol hardens and spontaneously sets or coagulates into a homogeneous mass termed the "hydrogel". This setting of the sol is preferably carried out at a temperature of about 70° F. The time of setting is approximately 5 hours. If such a hydrogel is properly washed and almost wholly dehydrated, a hard, porous, highly adsorbent gel will result.

It is to be understood that the invention is not limited to this particular manner of producing the hydrogel, as other methods may be employed.

Step 3.—The hydrogel is then allowed to stand for about 2 hours longer or a total of 7 hours from beginning of mixing, and thereafter is broken up and placed upon suitable trays.

Step 4.—The hydrogel is washed from 36 to 48 hours with water at the proper temperature to give a final product of the desired apparent density. If a high density product is wanted, that is, a close pore gel suitable for adsorption in the gaseous and vapor phase, the hydrogel is washed 36 to 48 hours with water at a temperature of 90° to 125° F. but preferably in the neighborhood of 105° F. This will give a final dried product having apparent densities of about 0.69, 0.91 and 1.24 after reactivations for three hours at temperatures of 600°, 1,000° and 1,600° F. respectively.

If a final product with a somewhat lower density is wanted, a product suitable for general adsorption work, the hydrogel is washed from 36 to 48 hours with water at a temperature of 125° to 160° F., preferably about 150° F. The final dried product has apparent densities of about 0.61, 0.79 and 0.99 after reactivations for three hours at temperatures of 600°, 1,000° and 1,600° F., respectively.

For a low density or wide pore gel, suitable for liquid phase adsorption and adsorption from vapor saturated gas mixtures, the hydrogel is washed from 36 to 48 hours with water at a temperature of 160° to 190° F. but preferably at about 175° F. The final dried product has apparent densities of about 0.52, 0.64 and 0.79 after reactivations for three hours at temperatures of 600°, 1,000° and 1,600° F.

Alternative step 4.—According to another method, the hydrogel is soaked for six hours or more in water having a temperature of 105° to 175° F., or is washed for the same length of time with water of this temperature. Thereafter the hydrogel is washed with cold water below 70° F. for about 45 hours. The final product will have an apparent density depending upon the temperature of the hot water.

Step 5.—After the hot water treatment, the hydrogel is dried or dehydrated in any suitable manner. According to one method, this is accomplished by passing a stream of air over the hydrogel at a temperature of 75° C. to 120° C. for a time and then slowly increasing this temperature to 300° C. to 400° C. Other methods giving a satisfactory product may be employed. The final product usually has a water content of 5% to 15% of the weight of the dried gel and may have an apparent density as low as about 0.5.

The term "apparent density" as used herein is the weight in grams of one cubic centimeter of the material made up of particles of a definite size. The figures given herein for the value of the apparent density after activation at 600° F. were obtained from a mass of gel of 8 to 14 mesh particles, that is to say, all the particles will pass through an 8-mesh sieve, but will be caught on a 14-mesh sieve. The values for apparent density after activation at 1,000° to 1,600° F. were obtained with samples of the gel in powdered form of 200 to 300 mesh, that is to say, the particles of the gel will pass through a 200-mesh sieve but will be caught on a 300-mesh sieve.

This application is a continuation in part of application Serial No. 248,762, filed December 30, 1927.

Having thus described the invention, what is claimed as new and desired to be secured by Letters Patent is:

1. In the process of producing gels in which a hydrogel is washed with heated water, that improvement pertaining to controlling the apparent density of the gel which comprises adjusting the temperature of the heated water, the temperature chosen for the water being the higher as the apparent density desired is lower.

2. In the process of producing gels in which a hydrogel is washed with heated water for the removal of impurities, that improvement pertaining to the lowering of the apparent density of the final gel obtained which comprises, adjusting the temperature of the heated water to that adapted to produce a gel of the desired apparent density, the higher the temperature of said wash water the lower the apparent density of the final dried gel obtained.

3. In the process of producing gels in which a hydrogel is washed with heated water, that improvement relating to controlling the apparent density which comprises, adjusting the temperature of heated water to that adapted to produce a gel of the desired apparent density, and treating the hydrogel therewith, the temperature chosen for the water being the higher as the apparent density desired is lower.

4. In the process of producing gels, that improvement relating to controlling the apparent density which comprises soaking the hydrogel in heated water, the temperature of which has been adjusted to produce the gel of the desired apparent density, the temperature chosen for the water being the higher as the apparent density desired is lower, and washing the treated hydrogel with cold water.

5. A process according to claim 4 wherein said soaking in heated water is for a period of about six hours.

6. In the process of producing gels in which a hydrogel is washed with heated water, that improvement relating to controlling the apparent density of the gel within the range of about 0.5 to 1.24 when activated at about 600° to 1600° F. which comprises adjusting the temperature of the wash water within the range of from about 90° to 190° F., the temperature chosen for the water being the higher as the apparent density desired is lower.

7. In the process of producing gels in which a hydrogel is washed with heated water, that improvement relating to controlling the apparent density of the gel within the range of about 0.52 to 0.79 when activated at about 600° to 1600° F. which comprises, adjusting the temperature of the wash water within the range of about 160° to 190° F., the temperature chosen for the water being the higher as the apparent density desired is lower.

8. In the process of producing gels in which a hydrogel is washed with heated water, that improvement relating to controlling the apparent density of the gel within the range of about 0.61 to 0.99 when activated at about 600° to 1600° F. which comprises, adjusting the temperature of the wash water within the range of about 125° to 160° F., the temperature chosen for the water being the higher as the apparent density desired is lower.

9. In the process of producing gels in which a hydrogel is washed with heated water, that improvement relating to controlling the apparent density of the gel within the range of about 0.69 to 1.24 when activated at about 600° to 1600° F. which comprises, adjusting the temperature of the wash water within the range of about 90° to 125° F., the temperature chosen for the water being the higher as the apparent density desired is lower.

In testimony whereof we hereunto affix our signatures.

GERALD C. CONNOLLY.
ERNEST B. MILLER.